United States Patent [19]

Behnke

[11] Patent Number: 4,460,346
[45] Date of Patent: Jul. 17, 1984

[54] ECCENTRIC SHAFT AND METHOD OF MANUFACTURE

[75] Inventor: Thomas L. Behnke, Durand, Mich.

[73] Assignee: General Steel Industries, Inc., St. Louis, Mo.

[21] Appl. No.: 149,164

[22] Filed: May 30, 1980

[51] Int. Cl.³ .................... B65G 27/00; F16C 3/18
[52] U.S. Cl. ..................................... 464/179; 74/87; 198/766
[58] Field of Search ............... 74/61, 87; 198/752, 198/766, 770; 404/117; 464/179, 180

[56] References Cited

U.S. PATENT DOCUMENTS

| | | | |
|---|---|---|---|
| 3,528,541 | 9/1970 | Barton et al. | 198/766 X |
| 3,598,029 | 8/1971 | Baramythioti | 74/87 X |
| 3,882,996 | 5/1975 | Musschoot | 198/770 |
| 4,176,983 | 12/1979 | Gardner | 198/752 X |

FOREIGN PATENT DOCUMENTS 179145 7/1954 Fed. Rep. of Germany ...... 464/179

Primary Examiner—Stuart S. Levy
Assistant Examiner—Daniel P. Stodola
Attorney, Agent, or Firm—Learman & McCulloch

[57] ABSTRACT

An elongate eccentric shaft formed from a cylindrical billet has cylindrical bearing sections at its opposite ends, a cylindrical center section, and cylindrical coupling sections outboard of and eccentric to the center section. The cylindrical sections are of uniform diameter, the bearing and center sections have coincident longitudinal axes, and the longitudinal axes of the coupling sections are coincident with one another and offset from the axes of the other sections. Adjacent each coupling section is an elliptical section having a major axis the length of which is no greater than the diameter of the cylindrical sections and a minor axis the length of which is less than that of the major axis by an amount corresponding to one-half the offset of the aforementioned longitudinal axes.

16 Claims, 6 Drawing Figures

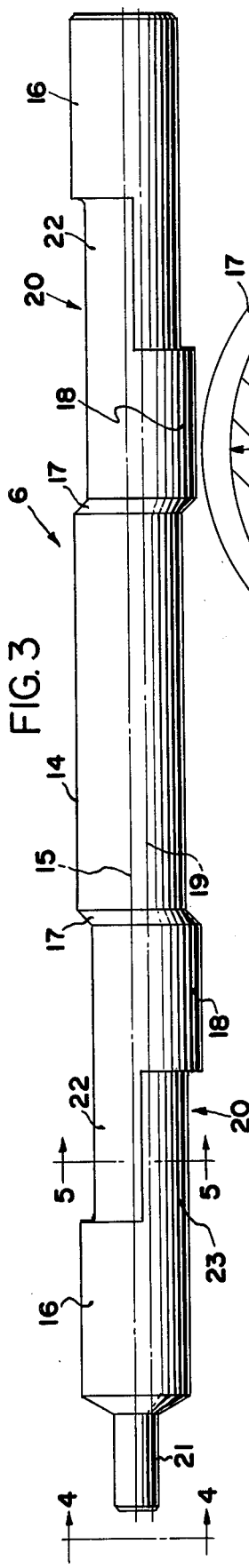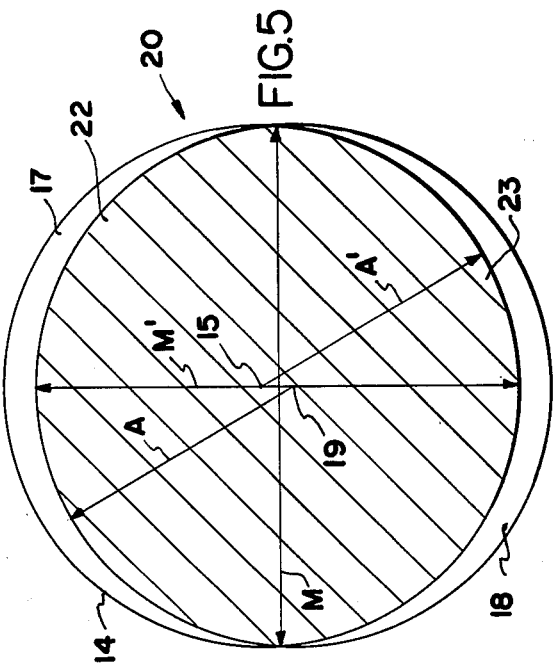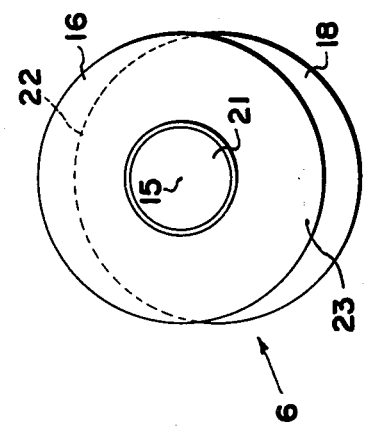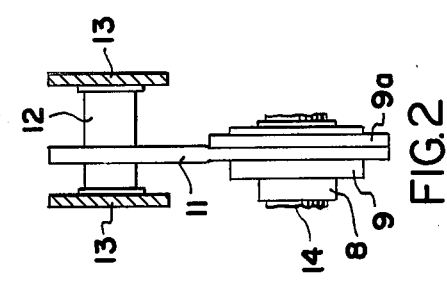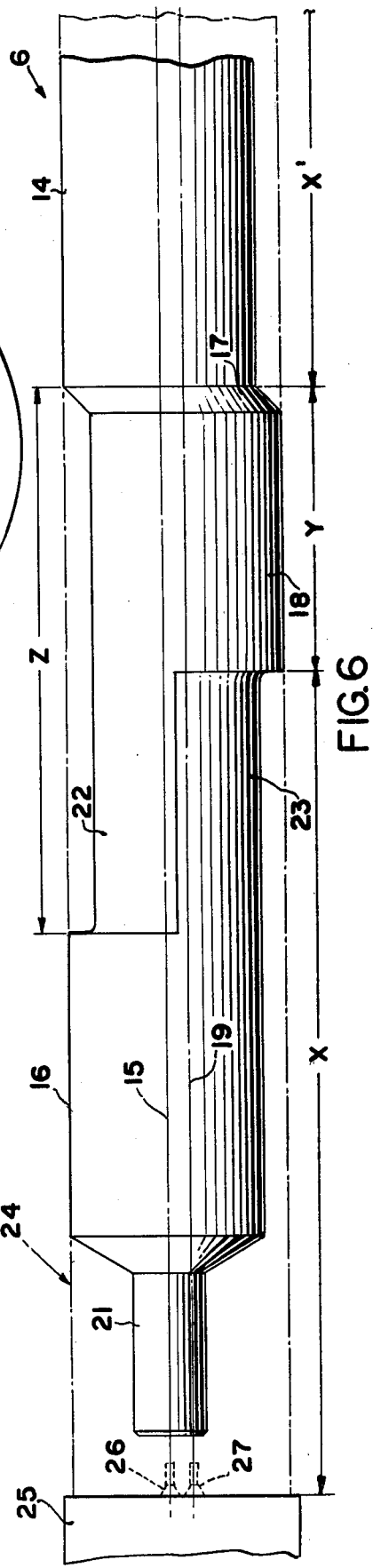

ECCENTRIC SHAFT AND METHOD OF MANUFACTURE

BACKGROUND OF THE INVENTION

Vibratory machinery such as screens, conveyors, shakeouts, and the like conventionally include a trough-like material support which is oscillated in an orbital path to advance material along the length of the support. The orbital oscillation of the support conventionally is effected by at least one motor driven shaft journaled for rotation on a base and having one or more eccentric sections drivingly coupled to the material support. In the assembly of an eccentric shaft of conventional construction with the vibratory machinery, the shaft is supported on the base by outboard bearings and the eccentric portion or portions of the shaft are accommodated in inboard bearings which are coupled to the material support. To facilitate assembly oversize inboard bearing openings have been provided which have had to be fitted with specially shaped (crescent) bushing inserts to conform such bearing openings to the configuration of the associated portions of the shaft. While carrying no greater load than the outboard bearings, the inboard bearings have had to be larger and consequently less economical to use.

The utilization of bushing inserts has also not been altogether satisfactory for a number of reasons. For example, considerable time is involved and the use of bushing inserts does not always result in precision alignment of the eccentric shaft with the several bearings, as a consequence of which operation of the machinery may be adversely affected and excessive wear of the relatively movable parts may result, thereby accelerating the necessity of replacement of such parts.

SUMMARY OF THE INVENTION

The principal objective of the invention is to provide an eccentric shaft for vibratory machinery of the kind referred to and which overcomes the disadvantages of eccentric shafts heretofore used for similar purposes. This objective is attained by the production and use of an eccentric shaft having a cylindrical, mounting bearing section at each end, a cylindrical center section having a longitudinal axis coincident with that of the bearing sections, eccentric coupling sections outboard of the center section having coincident longitudinal axes offset from and parallel to the longitudinal axis of the center section, and an elliptical section joined to each of the coupling sections inboard of the associated mounting bearing section. Each elliptical section has a major axis the length of which is no greater than the diameter of the largest cylindrical section, and a minor axis having a length less than that of the major axis. Each elliptical section has a first semi-cylindrical surface formed on an arc having a center on the longitudinal axis of the center section and a second semi-cylindrical surface formed on an arc having its center on the longitudinal axis of the eccentric bearing sections. Each elliptical section is symmetrical about a longitudinal axis located midway between the longitudinal axis of the center section and the longitudinal axes of the eccentric coupling sections. The construction is such that no bushing inserts are required in the assembly and disassembly of the eccentric shaft with and from the remainder of the vibratory machinery.

DESCRIPTION OF THE DRAWINGS

FIG. 2 is a sectional view, on a reduced scale, and taken on the line 2—2 of FIG. 1;

FIG. 3 is an elevational view of an eccentric shaft according to the invention;

FIG. 4 is an end elevational view as viewed in the direction of the arrows 4—4 of FIG. 3;

FIG. 5 is a greatly enlarged sectional view taken on the line 5—5 of FIG. 3; and FIG. 6 is a fragmentary, diagrammatic view illustrating the manner in which the eccentric shaft is formed.

DETAILED DESCRIPTION

Figure 1:
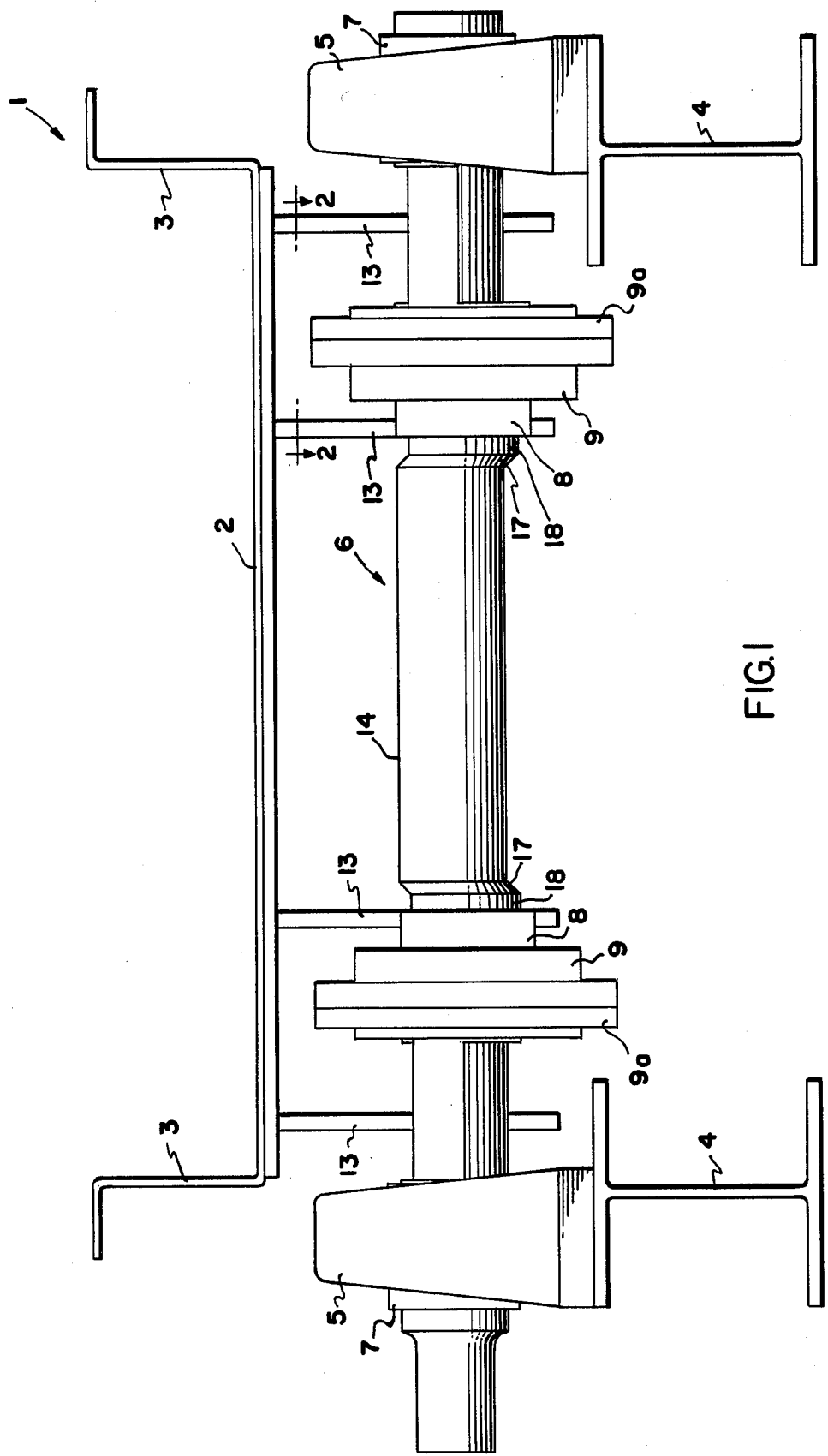
FIG. 1 is an end elevational view of a vibratory conveyor or the like equipped with an eccentric shaft constructed in accordance with the invention.

A balanced eccentric shaft according to the invention is adapted for use with vibratory apparatus 1 such as a conveyor, a screen, or the like comprising a trough-shaped material support member having a bottom 2 and upstanding, spaced apart side walls 3. Conventionally, the material support is mounted on and above a base having spaced apart frame members 4 on each of which is mounted a bearing housing 5. An eccentric shaft 6, to be described in more detail subsequently, has its ends journaled in bearings 7 carried by the bearing housings 5. The shaft has intermediate portions thereof journaled in bearings 8 carried by bearing supports 9, each support 9 having a flange 9a coupled to one end 10 of a drive arm 11 extending longitudinally of the material support and being fitted in the usual manner to a resilient mount 12 fixed at its opposite ends to a pair of brackets 13 suspended from the bottom 2. The bearings 7 and 8 are conventional, annular bearings of the same size.

The eccentric shaft 6 of the preferred, illustrated embodiment has a cylindrical center section 14 having a longitudinal axis represented by the dash line 15 (FIG. 3). At each end of the shaft is a cylindrical bearing section 16, each of which has a longitudinal axis coincident with the axis 15. The diameter of each bearing section 16 is uniform and corresponds to the diameter of the center section 14 so that no inbalance is imparted to the shaft.

Joined to each end of the center section 14 by a beveled shoulder 17 is an eccentric, cylindrical coupling section 18, the diameter of each of which is uniform and corresponds to the diameter of the sections 14 and 16. The coupling sections 18 have coincident longitudinal axes represented by the dash line 19, the axes of the coupling sections 18 being offset from and parallel to the axis 15.

Interposed between each bearing section 16 and the adjacent coupling section 18 is an elliptical section 20 which will be described more fully hereinafter. At one end of the shaft 6 is a cylindrical extension 21 of reduced diameter having a longitudinal axis coincident with the axis 15. A driving pulley (not shown) is adapted to be fixed to the extension 21 and coupled by a belt or the like to a driving motor to effect rotation of the shaft 6 about the axis 15.

As is best shown in FIG. 5, each of the elliptical sections 20 has a semi-cylindrical surface 22 formed on an arc A having its center located on the axis 19 of the coupling sections 18. Each elliptical section has a second semi-cylindrical surface 23 formed on an arc A′ having its center located on the axis 15. Each of the arcs A and A' is identical in length and the length of each arc corresponds to the radius of the cylindrical sections 14, 16, and 18. As a consequence, each elliptical section 20 has a major axis M and a minor axis M', the length of the major axis being no greater than the diameter of the cylindrical shaft sections and the length of the minor axis M' being less than that of the major axis by a distance corresponding to one-half the spacing between the longitudinal axes 15 and 19.

The shaft 6 may be formed from a cylindrical billet 24 fragmentarily and diagrammatically shown in FIG. 6. At each end of the billet is clamped a fixture block 25 provided with two lathe center points 26 and 27, the center 26 coinciding with the axis 15 and the center 27 coinciding with the axis 19. The fixtures 25 initially are chucked between the head and tail stocks of a lathe to support the billet for rotation about the axis 15. A cutting tool (not shown) forming part of the lathe removes material from the billet in a first cutting stage to form the two bearing sections 16 and the center section 14. The cutting tool does not traverse the entire length of the billet 24 in the first cutting stage, but skips those portions thereof at which the coupling sections 18 are to be formed. In the first cutting stage, however, the surfaces 23 of the elliptical sections are formed.

The partially completed shaft is demounted from the lathe and remounted between the head and tail stocks for rotation about the axis 19. The cutting tool then is set to commence cutting operations at the inboard end of the bearing section 16 and remove material from the billet 24 to form the shoulders 17, the surfaces 22 of the elliptical sections 20, and the remaining half of the cylindrical surfaces of the coupling sections 18.

The procedural steps in producing the shaft 6 can best be understood from FIG. 6 which illustrates approximately one-half the billet and the shaft. The billet is cylindrical and has a uniform diameter from end to end. The radius of the billet lies midway between the centers 26 and 27.

It will be understood that the following description relates only to the disclosed portion of the billet and that the process is continued to the opposite end of the billet.

In the first cutting stage the billet is rotated about the axis 15. In this stage the cutting tool traverses the zone X, skips the zone Y, and traverses the zone X' (which extends to the right hand end of the center section 14). This operation forms two longitudinally spaced cylindrical sections which will become the bearing section 16 and the center section 14. The surface 23 of the elliptical section 20 and one-half the surface of the coupling section 18 also will be formed in this stage.

Following mounting of the billet to rotate about the axis 19 during a second cutting stage, the cutting tool traverses the zone Z (which includes a portion of the zone Y) and forms the shoulder 17, the second half of the surfaces of the coupling section 18, and the surface 22 of the elliptical section 20.

The shaft 6 is completed by forming the extension 21 and cutting it to the desired length.

To assemble the finished shaft 6 with the remainder of the vibratory apparatus is a simple matter. The shaft may be first thrust endwise through the enlarged openings in drive arms 11 until its central portion 14 is received between them. The inner race of these inboard roller bearings 8 will have been premounted on the shaft on portions 18 by slipping them over the ends 16 of the shaft, and will move through these enlarged openings which carry the outer race of the bearings 8. Their mounts 9 can then be slipped over the ends of the shaft, and slipped over bearings 8 until the flanges 9a abut arms 11. The flanges 9a bolt to arms 11 and finally outboard bearings 7 and bearing supports 5 can be slipped over the ends 16 of the shaft and secured in position in frame members 4.

The disclosed embodiment is representative of a presently preferred form of the invention, but is intended to be illustrative rather than definitive thereof. The invention is defined in the claims.

What is claimed is:

1. In combination with an axially extending eccentric shaft having at spaced zones along its axial length a first cylindrical bearing section, a frame supported bearing journaling said bearing section; a second cylindrical coupling section forming another part of said shaft eccentric to said first section; a surface to be vibrated; a bearing enclosing said coupling section connecting with said surface, and a section of substantially elliptical cross-section between said first and second sections having a major and minor axis of differing length, said elliptical section major axis being no greater in length than the diameter of either of said cylindrical sections.

2. An eccentric shaft according to claim 1 wherein the diameters of first and second cylindrical sections are substantially uniform.

3. An eccentric shaft according to claim 2 wherein said first and second cylindrical sections have offset, substantially parallel longitudinal axes, said elliptical section having a minor axis the length of which corresponds to the diameter of said cylindrical sections less the distance that said axes are offset.

4. An eccentric shaft according to claim 1 wherein said shaft includes a pair of said cylindrical bearing sections with a pair of said cylindrical coupling sections inboard thereof and further includes a cylindrical central section having a diameter corresponding substantially to that of said cylindrical bearing sections, said central section having a longitudinal axis coincident with the longitudinal axis of said cylindrical bearing sections.

5. An eccentric shaft according to claim 4 wherein said cylindrical bearing sections are adjacent one end of said shaft and wherein an elliptical section is contiguous to each cylindrical bearing section.

6. An eccentric shaft according to claim 1 including an extension at one end of said shaft adapted to support a driving member, said extension having an axis of rotation coincident with the longitudinal axis of said first section.

7. An eccentric shaft according to claim 1 wherein said elliptical section has a first semi-cylindrical surface formed on an arc having its center in the longitudinal axis of said first cylindrical section and a second semi-cylindrical surface formed on an arc having its center on the longitudinal axis of said coupling section.

8. An eccentric shaft for a vibratory conveyor, and the like, said shaft having a cylindrical center section; a cylindrical bearing section at each end of said shaft, each of said bearing sections having a diameter corresponding substantially to that of said center section and having a longitudinal axis coincident with the longitudinal axis of said center section; a cylindrical coupling section interposed between said center section and each of said bearing sections, each of said coupling sections having a longitudinal axis offset from the longitudinal axis of said center section; and an elliptical section contiguous to each of said coupling sections and inboard of said bearing sections, each of said elliptical sections having corresponding major and minor axes of different extent, the major axis of each of said elliptical sections having a length no greater than the diameter of any cylindrical section.

9. An eccentric shaft according to claim 8 wherein each of said elliptical sections is interposed between the associated coupling section and the associated bearing section.

10. An eccentric shaft according to claim 8 wherein each of said cylindrical sections is of substantially uniform diameter.

11. An eccentric shaft according to claim 8 wherein each of said elliptical sections has a first semi-cylindrical surface formed on an arc having its center on the longitudinal axis of said center section, and a second semi-cylindrical surface formed on an arc having its center on the longitudinal axis of the associated coupling section.

12. The shaft of claim 8 in an assembly having its bearing sections supported by fixed frame supported bearings and its coupling sections enclosed by bearings connected with a conveyor surface to be vibrated.

13. An eccentric shaft for a vibratory conveyor, or the like, said shaft having a cylindrical bearing section at each end of said shaft; a cylindrical coupling section at each end of said shaft inboard of said bearing sections having a longitudinal axis offset from the longitudinal axis of said bearing sections; and an elliptical transition section contiguous to each coupling section and each bearing section, each of said elliptical sections having major and minor axes of differing lengths, the major axis of each of said elliptical sections having a length no greater than the diameter of the cylindrical sections.

14. An eccentric shaft according to claim 13 wherein each of said elliptical sections has a first semi-cylindrical surface formed on an arc having its center on the longitudinal axis of said bearing sections, and a second semi-cylindrical surface formed on an arc having its center on the longitudinal axis of the coupling section.

15. An eccentric shaft according to claim 13 wherein each of said cylindrical sections is of the same diameter.

16. The shaft of claim 13 in combination with an assembly comprising fixed frame supported bearings journaling said bearing sections, and bearings enclosing said coupling sections which are connected with a conveyor surface to be vibrated.

* * * * *